Sept. 30, 1969  G. E. BARKER  3,469,590
MODULATING CONTROL VALVE
Filed Oct. 17, 1966  4 Sheets-Sheet 1

INVENTOR
GEORGE E. BARKER
BY
Robert J. Schaap
ATTORNEY

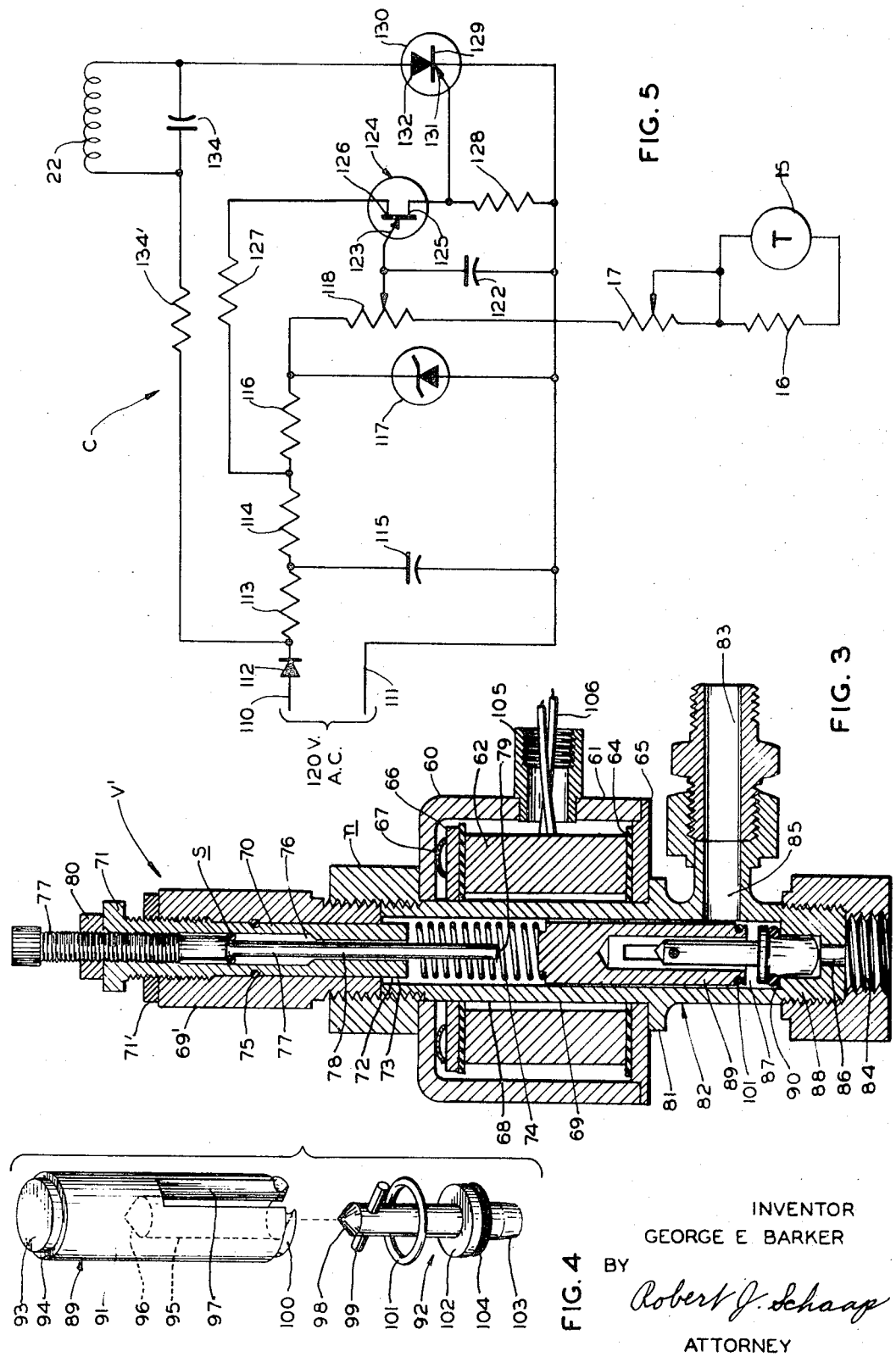

United States Patent Office 3,469,590
Patented Sept. 30, 1969

3,469,590
MODULATING CONTROL VALVE
George E. Barker, St. Louis, Mo., assignor to Monsanto Company, St. Louis, Mo., a corporation of Delaware
Filed Oct. 17, 1966, Ser. No. 587,236
Int. Cl. E03b 1/00; F16k 31/02
U.S. Cl. 137—1                                9 Claims

ABSTRACT OF THE DISCLOSURE

A furnace control system employing a unique type of control valve for regulating the flow of fuel to the heating member. The valve includes a movable plunger which will move from the valve seat to the open position when a control signal to the solenoid coil of the valve exceeds a predetermined set point value. The plunger will move to a position of minimum modulation which is established between the upper limit of plunger travel and the valve seat. The upper limit of the plunger movement is defined by a nonmagnetic element. When the plunger reaches the position of minimum modulation, it can thereafter be modulated by signals to the solenoid coil. During the travel from the valve seat to the position of minimum modulation, the plunger moves through a magnetically unstable region and during the position of modulation the plunger moves through a magnetically stable region. A second type of valve plunger including two sections which are attached but nevertheless movable with respect to each other is also disclosed.

---

This invention relates in general to certain new and useful improvements in temperature control systems and more particularly to a modulating temperature control system and method for maintaining a relatively constant temperature within a selected environment.

In recent years, there has been an increasing demand for efficient and low cost temperature control systems both in industrial and domestic use. Most of the existing industrial type of temperature control systems and particularly the furnace control systems are too expensive and not readily adaptable for home furnace control systems.

The conventional domestic hot-air gas furnace in typical home furnace control systems is controlled by an off-on thermostat, which in turn controls the gas to a burner by means of an off-on solenoid valve. This type of arrangement produces a situation where the furnace is either on at full capacity or completely off. Conventional heat anticipators have been commonly used in connection with furnace systems of this type in order to reduce overshoot and undershoot conditions. However, temperature cycling still occurs along with the undesirable cold blasts of air at both the beginning and the end of the heating cycle. Cycling is more severe in relatively mild weather when the demand is low in relation to the furnace capacity.

Conventional modulating control valves which are commercially available are not feasible for use in temperature control systems since they are not capable of effective modulating action in the low flow ranges and moreover would modulate below the minimum flow rate necessary to sustain operation of a burner. Furthermore, actuators of the type described have undesirable features when applied to furnace control systems. A conventional gas burner cannot be operated below a certain minimum gas rate without a flame-out. The flame-out could lead to a dangerous accumulation of gas if the valve were not immediately shut off. A conventional modulating valve would continue to modulate the gas flow all the way to zero flow. Consequently, a conventional modulating valve would create a dangerous situation and would, therefore, be unfeasible for use in furnace control systems.

OBJECTS

It is, therefore, the primary object of the present invention to provide a temperature control system which is capable of producing a constant and uniform temperature without drafts in a selected environment.

It is another object of the present invention to provide a temperature control system of the type stated and a method of controlling temperature where the fuel rate to the temperature producing element can be modulated for close temperature control, thereby eliminating temperature cycling.

It is an additional object of the present invention to produce a temperature control system of the type stated which does not require elaborate control valve actuators and other expensive servomechanism components and can, therefore, be manufactured and installed at a relatively low cost.

It is also an object of the present invention to provide a furnace control system of the type stated which is highly efficient in its operation and which is adaptable to both industrial and home furnace control systems.

It is a salient object of the present invention to provide a control valve used with the furnace control system of the type stated, which control valve is capable of efficiently modulating fuel at low flow rates and without creating dangerous conditions of flame-out.

With the above and other objects in view, my invention resides in the novel features of form, construction, arrangement and combination of parts presently described and pointed out in the claims.

FIGURES

In the accompanying drawings (4 sheets):

FIGURE 3 is a vetrical sectional view taken along a vertical center line of a modified form of control valve, which is constructed in accordance with and embodies the present invention;

FIGURE 4 is an exploded perspective view of the valve plunger of the control valve of FIGURE 3;

FIGURE 5 is a diagrammatic view of a control circuit forming part of the temperature control system of the present invention;

Figure 7:
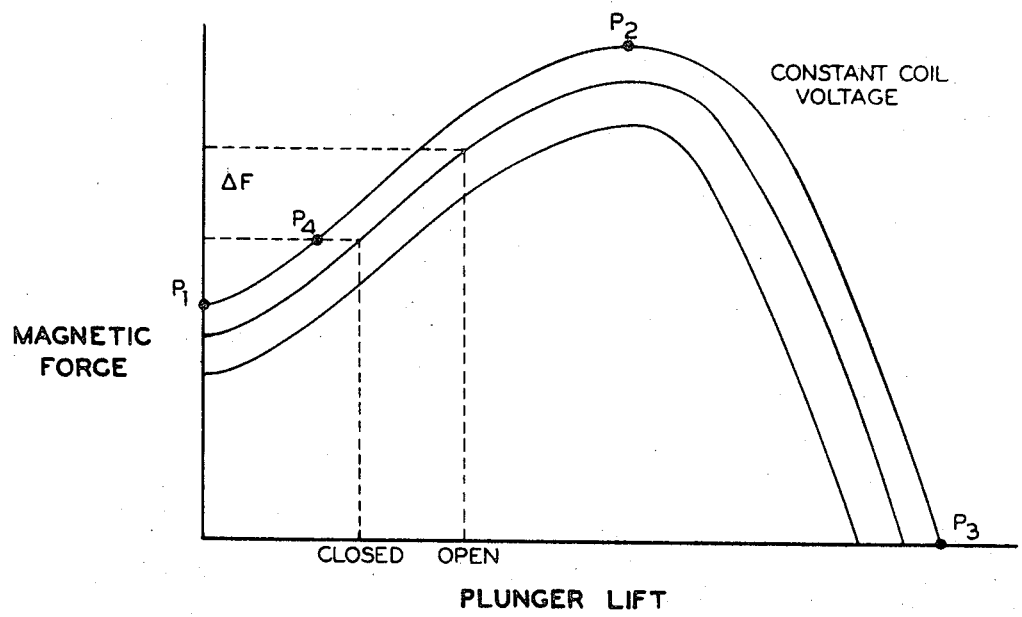
Figure 8:
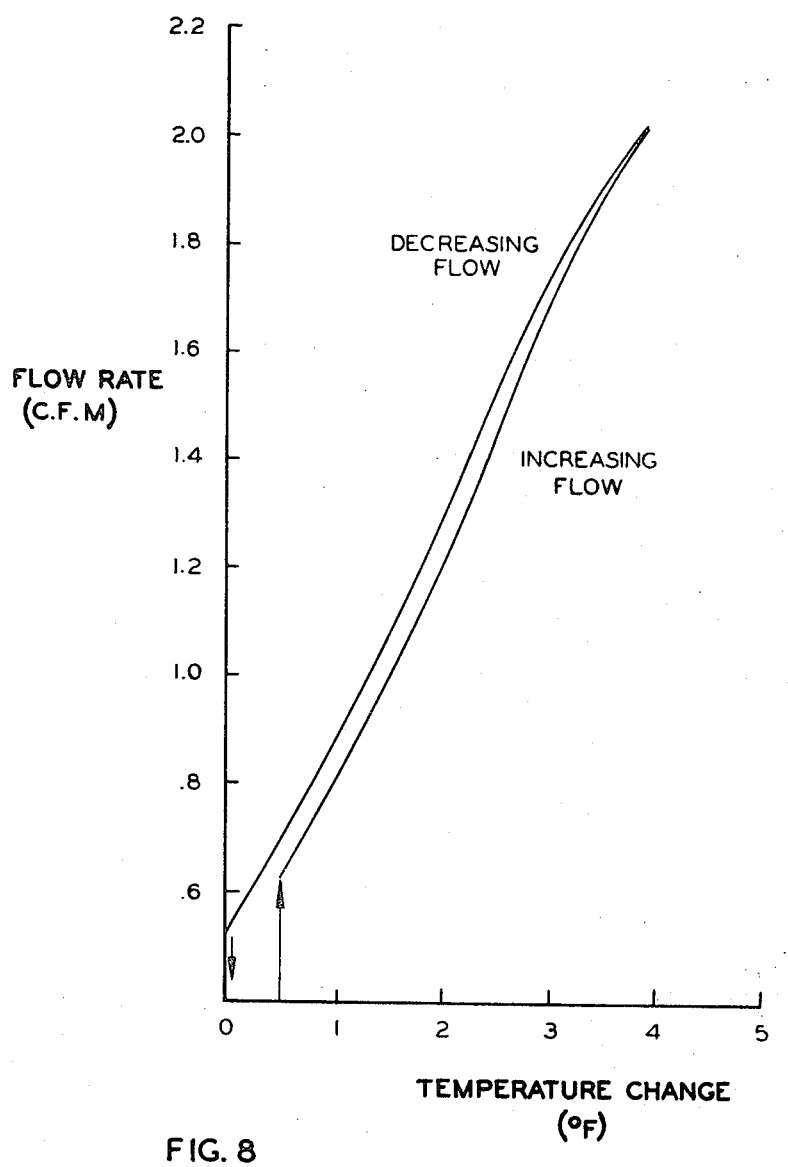

FIGURE 7 is a diagrammatic view showing the plot of the operational characteristics of the control valve forming part of the present invention where the valve plunger lift is plotted as a function of magnetic force across the solenoid coil for various coil currents; and FIGURE 8 is a diagrammatic view of a plot of the flow through the valve as a function of the change of temperature of the control system of the present invention.

GENERAL DESCRIPTION

Generally speaking, the present invention comprises a temperature controlling system having a bonnet or heat exchanger through which a temperature conveying fluid is passed. The fluid is preferably a gas such as air and is passed through a blower, the latter having a limit switch which is capable of opening at low temperatures in order to prevent the passing of cold air into the environment. A conventional furnace is disposed beneath the bonnet and is supplied with a fluid fuel which may be a conventional hydrocarbon gas. The fuel is passed through a modulating control valve which also forms part of the present invention. The modulating control valve is operatively connected to and operable by a control circuit which, in turn, is connected to a sensor disposed in the environment to be regulated. Furthermore, a setpoint potentiometer is connected in series with the sensor and the control circuit for regulating the desired temperature of the environment. Similarly connected in series with the control circuit and the modulating control valve is a bonnet safety switch, which is designed to open at a maximum temperature. The bonnet safety switch is located in close proximity to the bonnet, and if the bonnet achieves an undesirably high temperature, the switch is designed to open and, therefore, disconnect the control circuit from the control valve. A pilot valve is also connected to an orifice in an upstream position with respect to the control valve.

The control valve of the present invention is designed with a flow-to-close pattern. In the absence of current to the solenoid coil of the control valve, the valve plunger is held in the closed position by two forces. The first of these forces is the weight of the plunger and the second of the forces is the unbalanced pressure differential across the valve seat. The valve plunger is shiftable within the valve housing and is moved from its seated position when the current to the solenoid coil creates a sufficient magnetic flux to overcome the pressure differential and the weight of the valve plunger. The valve is provided with a nonmagnetic upper stop, the latter being adjustable. A spring is interposed between the upper end of the valve plunger and the upper valve stop. Furthermore, the spring in its relaxed or uncompressed position is smaller than the effective distance between the upper end of the valve plunger and the upper valve stop. Accordingly, modulation does not occur until the valve plunger has been lifted sufficiently from the valve seat so that the upper end of the spring strikes the upper stop. At this point, it is possible to modulate the control valve by regulating of the current to the solenoid coil.

A modified form of control valve is also provided and which is capable of preventing flame-out so that the furnace cannot be operated below a minimum gas rate. This latter modification of the control valve modulates gas flow to some level above zero flow. This control valve employs a two-piece valve plunger where the lower portion of the valve plunger is shiftable with respect to and also shiftable with the upper section of the valve plunger. By means of this construction, a minimum signal to the control circuit and from the control circuit to the valve may tend to move the upper section toward the upper stop.

The action of each of the valves of the present invention is more readily understood by explaining the forces acting on each of the valve plungers. The action of these forces is more specifically described in detail hereinafter. However when the control circuit to the solenoid is sufficient to move the valve plunger, the upper section will move until it has reached its extendedmost position with respect to the lower section. At this point, the lower section will also be moved from its closurewise position on the valve seat permiting flow on the control valve. In essence, each of the valves is designed to prevent a flow of fuel to the furnace when the flow of fuel is not sufficient to sustain the operation of the furnace.

In general, direct magnetic actuation of the control valve is not feasible due to the unusual high forces encountered when throttling fluids at high pressures. In cases of domestic natural gas, however, the maximum pressure differential to overcome is generally within the range of approximately 5 inches of water at flow rates of 2 to 3 cubic feet per minute. Under this type of condition, magnetic actuation is feasible at low power consumption. The common commercially available solenoid valves are not capable of modulating action in this range due to the design of the magnetic circuit. Consequently, the commercially available solenoid valve would result in off-on action only.

DETAILED DESCRIPTION

Furnace control system

Figure 1:
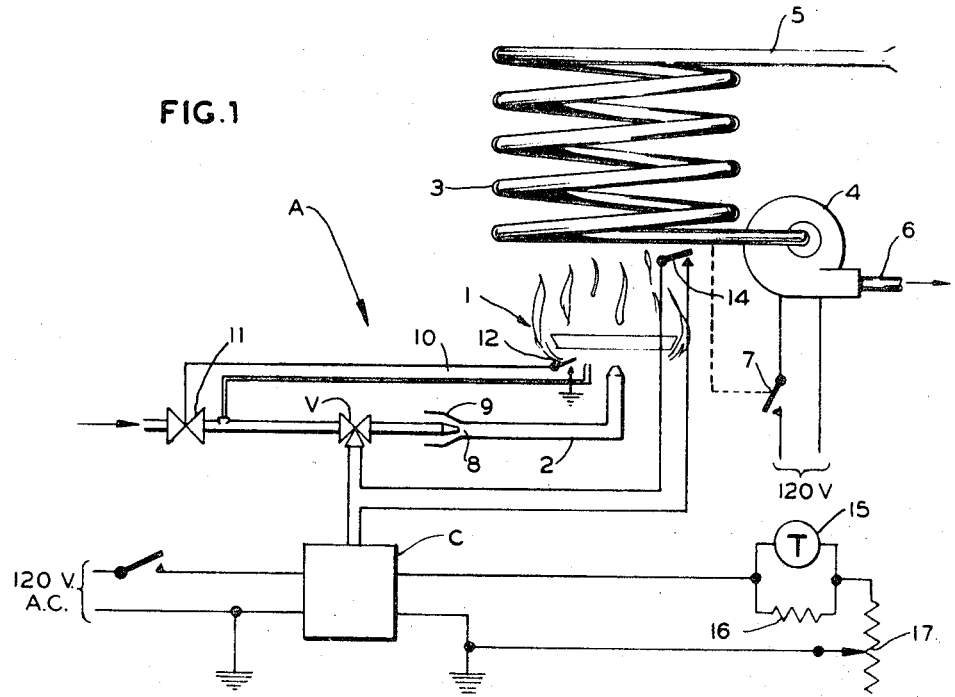
FIGURE 1 is a schematic view of a temperature control system constructed in accordance with and embodying the present invention.

The furnace control system A is schemactially illustrated in FIGURE 1 and generally comprises a conventional gas furnace 1 which is supplied with a source of gaseous fuel through a feeding tube or fuel line 2 and is designed to supply heat to a bonnet or heat exchanger 3, the latter carrying a heat conducting fluid. The heat conducting fluid in the bonnet 3, which may be in the form of a liquid or suitable gas such as air is transported by means of a conventional blower 4 to a selected environment (not shown). The upper end of the bonnet 3 has an inlet tube 5 for receiving the spent air or heat conducting fluid from the environment and a supply tube 6 is connected to the blower 4 for admitting the heated air to the selected environment in the manner as illustrated in FIGURE 1. Oftentimes when the furnace 1 is just started, the environment may call for warm air and hence the control system hereinafter described will cause the blower 4 to circulate the warm heating media to the environment. However, the furnace 1 may not have sufficiently heated the fluid in the bonnet 3 to the desired temperature and accordingly, the cold fluid in the bonnet 3 would be delivered to the environment. Consequently, the blower 4 is provided with a blower limit switch 7 which is connected to a suitable source of 110 volt current (not shown). The blower limit switch 7 is operatively connected and disposed in close relationship to the bonnet 3, and is designed to open at a low temperature, so that the blower 4 cannot be actuated when the air in the bonnet 3 is below the desired environment temperature.

The feeding or fuel line 2 is provided with a modulating control valve V which is hereinafter described in more detail and located between the control valve V and the feeding tip of the fuel line 2 is a fixed orifice 8 which fits within a flared out portion 9 of the fuel line 2. The fuel line 2 is then connected to a suitable source of gaseous fuel (not shown). Also connected to the fuel line 2 is a pilot line 10, which is also provided with an emergency valve 11. The pilot line 10 terminates in close proximity to the feeding tip of the fuel line 2 in the manner as illustrated in FIGURE 1. Furthermore, the emergency valve 11 is connected to an emergency sensing switch 12 which will close if the pilot flame should become extinguished, thereby closing the valve 11, in order to prevent the escape of fuel through the pilot line 10. The valve V is operable by and electrically connected to a control circuit C which is also hereinafter described in more detail. The control circuit C is, in turn, connected to a suitable source of 120 volt alternating electrical current and is also provided with a main off-on switch 13 interposed in one of the lines to the control circuit C. Also connected in series with the control circuit C and the modulating valve V is a bonnet safety switch 14, which is disposed in close proximity to the bonnet 3 and is designed to open at an undesirably high temperature. In this manner, if the bonnet 3 becomes dangerously hot, the switch 14, which is thermosensitive, will open. This will prevent a completion of the circuit to the control valve V and thereby close the fuel line 2 to the source of fuel.

The control circuit C is also connected to a temperature sensing resistor or so-called "thermistor" 15 which serves as a temperature sensor. Connected in parallel with the temperature sensing resistor 15 is a compensating resistor 16. Connected in series with the temperature sensing resistor 15 and the control circuit C is a set point potentiometer 17 which provides a means for regulating the temperature of the selected environment. In this connection, the temperature sensing resistor 15 and the set point potentiometer 17 along with the compensating resistor 16 are located in the controlled environment.

In its operation, a desired temperature is selected by means of the set point potentiometer. If the temperature falls below the desired set point maintained on the potentiometer 17 as sensed by the resistor 15, the control circuit C will initiate a control signal to the valve V. This, in turn, will permit the valve V to open thereby supplying fuel to the furnace 1, which in turn will heat the bonnet 3. The heat conducting fluid in the bonnet 3 will then be admitted to the controlled environment where the temperature will be increased. As the temperature of the environment increases, this increase of temperature will be detected by the temperature sensing resistor 15 which will, in turn, cause the control circuit C to reduce the signal to the valve V. This signal will decrease the amount of flow of fuel through the valve V and hence through the fuel line 2 causing the amount of heat produced by the furnace 1 to be reduced. This, in turn, will cause the amount of heat across the bonnet 3 to be reduced and hence the amount of heat delivered to the controlled environment will also be reduced.

Control valve

Figure 2:
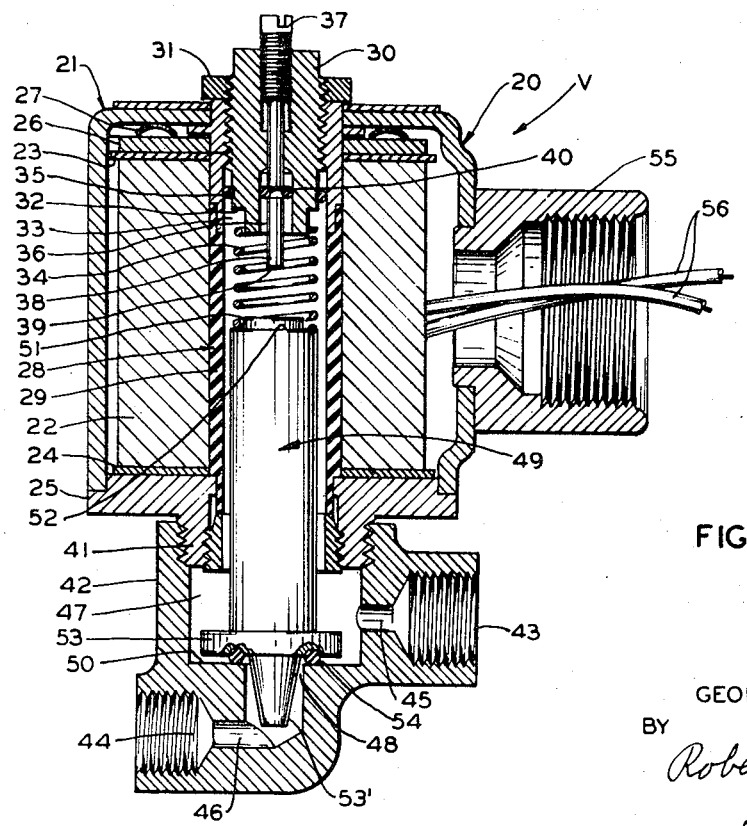
FIGURE 2 is a vertical sectional view taken along a vertical center line of the control valve used in the furnace control system and which is constructed in accordance with and embodies the present invention.

The control valve V is more fully illustrated in FIGURE 2 and generally comprises an outer control valve housing 20 including a somewhat cylindrical coil housing 21. Disposed within the coil housing 21 is a helically wound cylindrical solenoid coil 22 and disposed upon opposite ends thereof are upper and lower insulating washers 23, 24 respectively. The insulating washer 24 is facewise disposed upon the upper surface of a base plate 25 which forms part of the outer coil housing 21. Facewise disposed upon the upper insulating washer 23 is a circular flux plate 26. The assembly of the solenoid coil 22, the insulating washers 23, 24 and the flux plate 26 is suitably held in place and urged downwardly toward the base plate 25 by means of a set of flat springs 27. By reference to FIGURE 2, it can be seen that the flat springs 27 are interposed between the upper surface of the flux plate 26 and the undersurface of the top wall forming part of the coil housing 21.

The coil housing 21 and solenoid coil 22 are centrally apertured to accommodate a plunger tube assembly 28, which contains a cylindrical non-magnetic plunger tube 29 disposed axially within the coil housing 21. The upper end of the plunger tube 29 is internally threaded for accommodating a plug 30, the position of which is adjustable in the threaded upper end of the tube 29. The plug 30 has an externally threaded section which extends above the tube 29 and can be securely fastened in place by means of a nut 31, substantially as shown in FIGURE 2. The plug 30 extends inwardly into the tube 29 and is diametrally reduced at its lower end in the provision of a downwardly extending boss 32 thereby providing an annular relief or groove 33 for accommodation of a compression spring 34. The lower end of the plug 30 is annularly grooved for accommodating an annular neoprene seal 35.

The plug 30 is formed with an enlarged central bore 36 which is provided at its upper end with an internally threaded section. Disposed within the threaded section is an adjustable stop rod 37, which is externally threaded at its upper end for matching the mating internal threads in the bore of the plug 30. The stop rod 37 is integrally provided with a lower extension 38, the lower face of which serves as an upper plunger stop 39, in the manner as illustrated in FIGURE 2. An annular sealing ring 40 is disposed about the stop rod 37 and bears against the interior wall of the bore 36. Thus, it can be seen that the position of the upper plunger stop can be adjusted through adjustment of the stop rod 37. This mechanism provides for maximum and minimum limits of travel of a valve plunger hereinafter described.

The base plate 25 is integrally provided with a downwardly extending externally threaded circular boss 41 and threadedly secured thereto is a valve body 42, which is axially drilled from its transverse ends to provide inlet and outlet ports 43, 44 respectively. The inlet and outlet ports 43, 44 are, in turn, provided with ducts 45, 46 providing communication to a central fluid chamber 47, in the manner as illustrated in FIGURE 2. The communicating duct 46 opens through an orifice 48 into the fluid chamber 47. The portion of the valve body 42 surrounding the orifice 48 provides a valve seating surface.

Reciprocatively disposed within the plunger tube assembly 28 and being adapted for movement therein is a valve plunger 49 which is cylindrical in horizontal cross section. The valve plunger 49 is shiftable between the upper stop 39 and a lower stop 50 which serves as the valve seat or seating face. The plunger 49 is diametrally reduced at its upper end in the provision of an upstanding boss 51 thereby forming an annular groove 52 for accommodating the spring 34. Furthermore, by reference to FIGURE 2, it can be seen that the spring 34 is shorter than the distance between the lower face of the boss 32 and the upper face of the boss 51 so that the upper end of the spring 34 fits loosely around the boss 32 and does not contact the upper end of the relief 33 when the plunger 49 is in the seated position, as shown in FIGURE 2. It should be recognized that the spring 34 may be secured to the plug 30 and is engageable by the boss 51 of the plunger 49.

The lower end of the valve plunger 49 is integrally formed with an outwardly flaring flange 53 having a flat bottom face for engagement with the valve seat 50, when the plunger 49 is in the seated position. Integrally formed with the flange 53 is a downwardly projecting tapered plug 53', which extends through the orifice 48 into the communicating duct 46.

The plug 53' is tapered so that flow is a linear function of the coil current. Furthermore, since the coil current is a function of the temperature of the environment, the flow rate is, therefore, a linear function of the temperature change in the environment. This relationship is more fully discussed in detail hereinafter.

The flange 53 is annularly grooved to accommodate a flexible sealing ring 54 which engages the valve seat 50 and surrounds the orifice 48. The seating ring 54 or so-called "sealing ring" is preferably formed of a suitable flexible plastic or rubber material such as polybutadiene rubber or a copolymerization product of polybutadiene and acrylonitrile marketed under the term Buna-N rubber. A copolymer of hexafluoropropylene and vinylidene fluoride commercially available under the name of Viton-A has also been found to be suitable for use as a sealing ring. Other suitable rubber materials which are capable of being used in forming the sealing ring 54 are chloroprene and various polybutadiene-styrene rubbers. The butadiene-acrylonitrile rubbers are particularly useful inasmuch as these rubbers have a great deal of low temperature flexibility.

The housing 20 is also provided with a fitting 55 for accommodating a pair of leads 56 to the solenoid coil 22 in the manner as illustrated in FIGURE 2. These leads are ultimately connected to the control circuit C in the manner as illustrated in FIGURE 1. The control circuit C is more fully illustrated in detail in FIGURE 4 and is hereinafter described in detail.

Operation of the control valve

The valve V is particularly adapted for furnace control systems where a gas burner cannot be operated below a certain minimum gas rate without a flame-out. The control valve V is capable of being modulated above a certain minimum gas flow rate but does not modulate down to zero flow conditions. In order to describe the operation of the valve V, the valve V may be considered as two separate valves connected in series. The first valve may be a conventional off-on valve which supplies the minimum gas rate. The second of the valves may then be considered to be a modulating valve which covers the range between minimum and maximum flows. The valve V, of course, accomplishes this dual result through advantage of magnetic circuit characteristics. The production of the magnetic circuit characteristics by means of control pulses from the control circuit C will, however, be discussed in more detail hereinafter.

When a control signal is transmitted to the solenoid coil 22 through the lead lines 56, a magnetic flux path will be created tending to move the valve plunger 49 away from its seated position. This upward force created by the solenoid coil 22 must overcome the downward force of the mass of the plunger 49 and the pressure differential of fluid across the valve seat, since these latter two forces maintain the valve plunger 49 in the seated position as illustrated in FIGURE 2. When the magnetic force is sufficient due to a sufficiently strong control signal, the valve plunger 49 will snap open from its seated position. During the position where the plunger snaps open to the point where the upper end of the spring 34 first engages the plug 30, the valve V is operating in an unstable condition. The spring 34 is selected so that its spring constant is greater than the equivalent magnetic spring constant at the position of the valve plunger 49 where the spring 34 first contacts the plug 30. After the valve plunger 49 has been shifted to its lowermost position of modulation, that is where the spring 34 extends between and engages both the plug 30 and the valve plunger 49, the minimum flow of fuel necessary to sustain the operation of the furnace 1 will pass through the valve V. Flows beyond that point can be conveniently modulated by the size of the current to the solenoid coil 22. The size of the control signals will be described in more detail hereinafter.

The actual operation of the control valve V can be more readily understood by examining the forces acting on the valve plunger. The valve V operates in a flow-to-close pattern and accordingly, there is a force equivalent to the differential pressure times the area of the valve seat acting on the valve plunger urging the same to the closed position. The weight of the plunger and the force of gravity provides an additional force urging the plunger to the closed position. The plunger may be urged to the open position by the magnetic force created in the solenoid coil 22. When the magnetic force is sufficient to overcome the forces holding the valve plunger in the closed position, the plunger will lift from the valve seat. One of the unique characteristics is that the force moving the plunger to the open position increases with the lift of the valve plunger. This force diagram can be examined by reference to FIGURE 7, which is hereinafter discussed more fully in detail. When the magnetic force exceeds the forces holding the valve plunger in the closed position, the plunger is unstable. However, after the plunger contacts the spring 34, the plunger becomes stabilized. It should also be recognized that after the plunger 49 has reached the position of minimum modulation, the spring constant of the spring 34 is greater than the "magnetic spring constant." In other words, the rate of force increase created by the spring urging the plunger downwardly is greater than the magnetic force increase urging the plunger upwardly when the plunger contacts the spring 34.

It is to be noticed that the secondary force exerted by the spring does not act on the plunger until the plunger is a predetermined distance off of the valve seat and that this secondary force increases as the plunger lift increases. Also as indicated above, the rate of the secondary force increase which urges the plunger downwardly is greater than the magnetic force increase which urges the plunger upwardly.

It is to be noted that the variable areas of the plunger 53 will cause flow to increase as the lift increases. The plunger is so designed so that at the initial movement, flow through the valve seat is quite small. Furthermore, the plug is tapered so that flow changes with the coil current, or more accurately, with the temperature to produce a linear relationship. In effect, when the flow rate is plotted as a function of temperature, a linear relationship is attained.

Modified control valve

It is possible to provide a modified form of control valve V', substantially as illustrated in FIGURE 3 and which is substantially similar to the previously described control valve V. The control valve V' generally comprises an outer control valve housing 60 including a somewhat cylindrical coil housing 61. Disposed within the coil housing 61 is a helically wound cylindrical solenoid coil 62 and disposed upon opposite ends thereof are upper and lower insulating washers 63, 64 respectively. The insulating washer 64 is facewise disposed upon the upper surface of a base plate 65 which forms part of the outer coil housing 61. Facewise disposed upon the upper insulating washer 63 is a circular flux plate 66. The assembly of the solenoid coil 62, the insulating washers 63, 64 and the flux plate 66 is suitably held in place and urged downwardly toward the base plate 65 by means of a set of flat springs 67. By reference to FIGURE 3, it can be seen that the flat springs 67 are interposed between the upper surface of the flux plate 66 and the undersurface of the top wall forming part of the coil housing 61.

The coil housing 61 and solenoid coil 62 are centrally apertured to accommodate a plunger guide assembly 68, which contains a cylindrical plunger guide 69 disposed axially within the coil housing 61 and which contains a central non-magnetic section surrounded by magnetic sections at each of the transverse ends thereof. The upper end of the plunger guide assembly 68 extends slightly above the coil housing 61 when compared to the plunger guide assembly 29 with the outer housing 21 of the valve V. A nut $n$ is threaded about the upper portion of the plunger guide 69 and bears against the upper surface of the coil housing 61 for holding the assembly rigidly in place. A hollow sleeve 69' is diametrically reduced and externally threaded at its lower end and is inserted into the nut $n$ for securement thereto. The lower end of the sleeve 69' abuts the upper end of the guide 69 in the manner as illustrated in FIGURE 3. The upper end of the plunger guide 69 is internally threaded for accommodating a plug 70, the position of which is adjustable in the threaded upper end of the guide 69. The plug 70 has an externally threaded section which extends above the sleeve 69' and is integrally provided with an enlarged knurled head 71, substantially as shown in FIGURE 3. A locking nut 71' is threadedly disposed about the externally threaded section of the plug 70 and bears against the upper surface of the sleeve 69' for rigidly and releasably locking the plug in the sleeve 69'. The plug 70 extends inwardly into the guide 69 and is diametrically smaller at its lower end in the provision of a downwardly extending boss 72 thereby providing an annular clearance or relief 73. The lower end of the plug 70 is annularly grooved for accommodating an annular neoprene seal 75.

The plug 70 is provided with an enlarged central bore 76 which is provided at its upper end with an internally threaded section for accommodating an adjustable stop rod 77, which is externally threaded at its upper end for matching the mating internal threads on the plug 70. The stop rod 77 is integrally provided with a lower extension 78, the lower face of which serves as an upper plunger stop 79, in the manner as illustrated in FIGURE 2. A locking nut 80 is concentrically disposed about the stop rod 77 and can be tightened to bear against the upper surface of the knurled head 71 to adjustably hold the stop rod 77 in any desired position. An annular sealing ring $s$ is disposed about the stop rod 77 and bears against the interior wall of the bore 76. Thus, it can be seen that the position of the upper plunger stop can be adjusted through adjustment of the stop rod 77.

Integrally formed with the plunger tube 69 is an outwardly flaring boss 81 which bears against the underside of the base plate 67. Also integrally formed with the tube 69 is a valve body 82, which is axially drilled from one transverse end and from its bottom wall to provide inlet and outlet ports 83, 84, respectively. The inlet and outlet ports 83, 84 are, in turn, provided with ducts 85, 86 providing communication to a central fluid chamber 87, in the manner as illustrated in FIGURE 3. The communicating duct 86 opens through an orifice 88 into the fluid chamber 87. The portion of the valve body 82 surrounding the orifice 88 provides a valve seating surface or so-called "valve seat."

Reciprocatively disposed within the plunger tube assembly 68 and being adapted for movement therein is a two-piece valve plunger assembly 89 which is cylindrical in horizontal cross section. For convenience, the valve plunger assembly 89 may be hereinafter referred to as "valve plunger." The valve plunger 89 is shiftable between the upper stop 79 and a lower stop 90 which serves as the valve seat or seating face.

The valve plunger 89 is a two-piece plunger, where one of the pieces is shiftable with respect to the other and is also movable therewith. The valve plunger 89 is provided with an upper section or so-called "plunger tube" 91 and a lower section or so-called "plunger stem" 92. The plunger tube 91 is diametrally reduced at its upper end in the provision of an upstanding boss 93 thereby forming an annular groove 94 for accommodating the spring 74. Furthermore, by reference to FIGURE 3, it can be seen that the spring 74 is shorter than the distance between the lower face of the boss 72 and the upper face of the boss 93 so that the upper end of the spring 74 is disposed below the lower face of the boss 72 and does not contact the boss 72 when the valve plunger assembly 89 is in the seated position, as shown in FIGURE 3. It should be recognized that the spring 74 may be also secured to the plug 70 and engageable by the boss 93 of the plunger 89.

The plunger tube 91 is internally bored to provide a plunger stem chamber 95, the chamber being formed with a tapered upper end 96. Furthermore, the plunger tube 91 is provided with a pair of diametrally opposed elongated slots 97, which open at the lower end of the plunger tube 91 in the manner as illustrated in FIGURE 4. The plunger stem 95 is also provided with a tapered head 98, which fits snugly within the tapered upper end 96 of the plunger tube 91. A pair of retaining arms 99 are secured to and extend outwardly from the stem 95 and also extend outwardly through the slots 97 formed in the side wall of the plunger tube 91. Thus, the plunger stem 92 is guided in its movement as it shifts vertically with respect to the plunger tube 91. The plunger tube 91 is integrally provided with a diametrally reduced retaining flange 100 at its lower end and which is curled outwardly for accommodating a retaining ring 101. Thus, if the outwardly extending arms 99 are disposed in the slot 97 and the retaining ring 101 is secured to the outwardly flaring flange 100, the plunger stem 92 is retained in the plunger tube 91 but is also movable with respect thereto for a distance equal to the size of the slot 97. The lower limit of travel would be provided by the retaining ring 101 and the upper limit of travel is maintained by the tapered upper end 96.

The plunger stem 92 is integrally formed with an outwardly flaring flange 102 having a flat bottom face for engagement with the valve seat 90, when the plunger 89 is in the seated position. Integrally formed with the flange 102 is a downwardly projecting tapered plug 103, which extends through the orifice 88 into the communicating duct 86. The flange 102 is provided on its undersurface with a flexible sealing ring 104 which engages the valve seat 90 and surrounds the orifice 88. The seating ring 104 or so-called "sealing ring" is preferably formed of a suitable flexible plastic or rubber material such as a polybutadiene rubber or a copolymerization product of polybutadiene and acrylonitrile marketed under the term Buna-N rubber. A copolymer of hexafluoropropylene and vinylidene fluoride commercially available under the name of Viton-A has also been found to be suitable for use as a sealing ring. Other suitable rubber materials which are capable of being used in forming the sealing ring 54 are chloroprene and various polybutadiene-styrene rubbers. The butadiene-acrylonitrile rubbers are particularly useful inasmuch as these rubbers have a great deal of low temperature flexibility.

The housing 60 is also provided with a fitting 105 for accommodating a pair of leads 106 to the solenoid coil 62 in the manner as illustrated in FIGURE 3. These leads are ultimately connected to the control circuit C in the manner as illustrated in FIGURE 1.

Operation of modified control valve

The valve V' is also particularly adaptable for furnace control systems where a gas burner cannot be operated below a certain minimum gas rate without a flame-out. The control valve B' is similar to the valve V in that it is capable of being modulated above a certain minimum gas flow rate. In like manner, the valve V' does not modulate down to zero flow conditions. When analyzing the operation of the valve V', it might also be considered as two separate series connected valves where one of the valves is a conventional off-on valve and the second of the valves is a modulating valve, which covers a range between minimum and maximum flow.

When the control signal is transmitted to the solenoid coil 62, a magnetic flux path is created tending to move the valve plunger 89 from its seated position. This upward force created by the solenoid coil 22 must overcome the downward force of the mass of the plunger 89 and the pressure differential of fluid across the valve seat, since these latter two forces maintain the valve plunger 89 in the seated position, that is the position as illustrated in FIGURE 3. When the magnetic force is sufficient due to a sufficiently strong control signal, the plunger tube 91 will be pulled upwardly by the magnetic field. However, it is to be noted that the plunger stem 92 will remain in the seated position during a portion of the time that the plunger tube 91 is being shifted upwardly, since the retaining arms 99 will, in effect, shift downwardly in the slots 97. If for example, the control signal to the solenoid coil 62 should be suddenly reduced, the magnetic field will be reduced and hence the plunger tube 91 will then fall to its lowermost position as illustrated in FIGURE 3. At no time during the movement of the plunger tube 91 has the plunger stem 92 been removed from the valve seat permitting gas flow. This type of situation prevents any possible leakage of gas through the valve seat. However, if the control signal to the solenoid coil 62 is sufficiently strong to pull the plunger tube 91 upwardly to a point where the retaining arms 99 engage the retaining ring 101, the plunger stem 92 will also be moved upwardly from its seated position, and will, in effect, be carried by the plunger tube 91.

The actual operation of the control valve V' can be more readily understood by examining the forces acting on the valve plunger. The length of the "slotted link" or distance between the two pieces of the plunger assembly as maximum separation is a critical dimension in the operation of the valve V' and for purposes of force analysis, may be represented by $\Delta X_1$. The control valve V' is also operated on a flow-to-close pattern and consequently one of the forces holding the valve plug in the closed position is the differential pressure force multiplied by the area of the valve seat. The other force acting on the valve plug and holding the same in the closed position is the force of gravity multiplied by the mass of the valve plug. During conditions of no temperature change, i.e. conditions of no current in the solenoid coil, no forces act either upon the plunger stem 92 or the plunger tube 91. The only force holding the valve tube 89 in its seated position against the valve plug 92 is the force created by the force of gravity and the weight of the valve tube 89.

When a drop in temperature occurs in the environment, a current will be generated and transmitted to the solenoid coil 62 in a manner more fully hereinafter described in detail. At the outset, the magnetic force created by the solenoid coil 62 must exceed the force of gravity holding the valve tube 89 in its lowermost position, reference being made to FIGURE 3. When the magnetic force exceeds the force of gravity holding the valve tube 89 in its closed position, the valve tube 89 will shift upwardly toward the position of minimum modulation. During the initial portion of the lift, the valve tube 89 is rising through the slotted link. In other words, the outwardly extending arms 99 are, in effect, moving downwardly in the slot 97. The upward force acting on the plunger tube 91 will increase as the lift increases and as the length of the slotted link $\Delta X_1$, increases. Accordingly, the plunger tube 91 will shift upwardly with increasing acceleration due to the increasing force.

When critical length of the slotted link has been exhausted, that is when the outwardly flaring arms 99 engage the ring 101, the valve plug 92 will be urged upwardly. Furthermore, at this point, the plunger assembly 89 will function as a single element. In other words, the slotted link will serve as a rigid interconnection between the plunger tube 91 and the plunger stem 92. At this time, two additional forces urging the plunger assembly 89 in the downward direction will be added to the plunger tube 91. These forces are the differential pressure force and the force of gravity acting upon the plunger stem 92. If $\Delta F$ represents the increase in magnetic force due to movement $\Delta X_1$, the entire assembly will move upward providing $\Delta F > A \Delta P$ plus weight of the plunger assembly 89, where $A \Delta P$ represents the area of the valve seat multiplied by the differential pressure source. When the entire valve plunger assembly 89 is shifting upwardly, it will remain in a magnetically unstable condition. When the plunger assembly 89 reaches the position of minimum modulation, the valve V' will be operating in a magnetically stable range of operation. The trajectory of the plunger assembly 89 is more fully illustrated in the force diagram of FIGURE 7, which is more fully described hereinafter.

Control circuit

The control circuit C is schematically illustrated in FIGURE 5 and is powered from a 120 volt source of alternating electrical current (not shown) and includes a pair of conductors 110, 111. For purposes of description, the conductor 110 will be hereinafter referred to as a positive conductor and the conductor 111 will be hereinafter referred to as a neutral conductor. The positive conductor 110 is connected through a diode 112 which is, in turn, connected to a pair of filtering resistors 113, 114. Connected across the common connection of the resistors 113, 114 and to the conductor 111 is a capacitor 115. The resistor 114 is connected through a fixed resistor 116, which is in turn connected to a Zener diode 117, the latter having its opposite terminal connected to the neutral conductor 111, in the manner as illustrated in FIGURE 5. The fixed resistor 116 is, in turn, connected to one terminal of a potentiometer 118, the other terminal of which is connected to a terminal of the set point potentiometer 17, which serves as a thermostat. The other terminal of the potentiometer 17 is connected to the temperature sensing resistor or so-called "thermistor" 15 and connected across the thermistor 15 for the elimination of undesirable linearity effects is the compensating resistor 16 all in the manner as illustrated in FIGURE 4. The movable arm of the potentiometer 17 is also connected to one terminal of the thermistor 15. Consequently, it is possible to provide set point adjustment of the temperature in the controlled environment. It should be understood that the potentiometer 17 and the combination of the thermistor 15 and compensating resistor 16 are all located in the controlled environment. The thermistor 15 will measure the temperature of the environment and the variable resistor 17 will provide adjustment for the desired temperature of the environment.

The center tap of the potentiometer 118 is connected to a timing capacitor 122, which is also connected to the neutral conductor 111. The common connection of the timing capacitor 122 and the movable arm of the potentiometer 118 is connected to the emitter 123 of a unijunction transistor 124, which is used as a relaxation oscillator. The unijunction transistor 124 is provided with a base-1 125 and a base-2 126. The unijunction transistor 124 serves as the basic timing device that controls the firing angle of the circuit. The base-2 126 of the unijunction transistor 124 is connected through a temperature compensating resistor 127 which is, in turn, connected to the common connection of the resistors 114 and 116. The base-1 125 of the unijunction transistor 124 is connected to a resistor 128 to neutral conductor 111 and to a cathode electrode 129 of a silicon controlled rectifier 130. The base-1 125 is also connected to the gate electrode 131 of the silicon controlled rectifier 130. The silicon controlled rectifier 130 is also provided with an anode electrode 132 which is connected to one terminal of a capacitor 134, the opposite terminal of which is connected through a resistor 134' to the common connection of the diode 112 and the voltage dividing resistor 113. The solenoid coil 22 is then connected across the capacitor 134, in the manner as illustrated in FIGURE 5.

Operation of the control circuit

The thermistor 15 and the temperature compensating resistor 16 serve as a sensory mechanism for measuring the change of temperature in the controlled environment. This change in temperature is capable of being converted into a resistance change for use in the control circuit. Furthermore, it should be recognized that this temperature change can also be translated into another electrical change such as a voltage or a current change.

Figure 6:
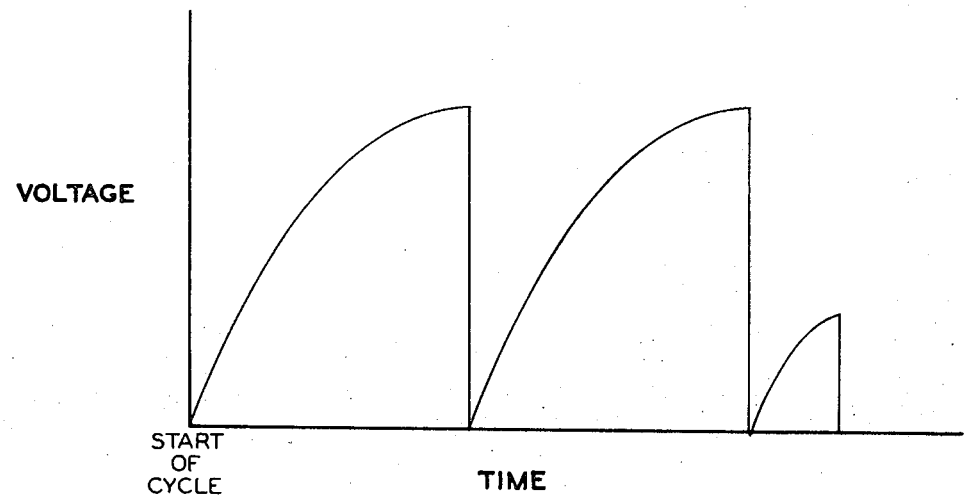
FIGURE 6 is a diagrammatic view of the voltage waveform as a function of time from the emitter of the unijunction transistor forming part of the control circuit of FIGURE 5.

The unijunction transistor 124 serves as a relaxation oscillator and delivers a current pulse into the gate of the silicon controlled rectifier 130 at a desired controllabel time within the positive cycle of the voltage from the source of electrical current. When the silicon controlled rectifier 130 receives this signal, it will begin to conduct and will continue until there is a reversal of current, at which time, conventional diode action stops the current flow. The operation of the relaxation oscillator 124 uses the principle of the unijunction transistor that condition between the emitter 123 and the base-1 125 is prevented unless the emitter-to-base-1 voltage is greater than a critical value, that critical value, being determined by the base-2 voltage to the base-1 voltage. When this peak voltage is exceeded, the effective resistance between the emitter 123 and the base-1 125 drops and approaches a zero level. Conduction will continue until the emitter-to-base-1 voltage drops below the valley point voltage. The wave form at the emitter of the unijunction transistor 124 is more fully illustrated in FIGURE 6.

The diode 112 serves as a rectifier and provides control voltage for the unijunction transistor 124. This control voltage from the rectifier 112 is reduced and clipped by the resistors 113, 114 and by the Zener diode 117. The capacitor 122 in conjunction with the signal from the thermistor 15 determines the firing time of the unijunction transistor 124.

During the time of the voltage rise at the emitter 123 of the unijunction transistor 124 the voltage difference maintained between the base-1 125 and the base-2 126 will be constant. When the voltage at the emiter 123 reaches a critical value, the unijunction transistor 124 will fire, thereby discharging the capacitor 122 through the resistor 128, permitting current flow into the gate electrode 131 of the silicon controlled rectifier 130. This pulse of current into the gate electrode 131 will cause the silicon controlled rectifier 130 to fire and begin supply of current to the solenoid coil 22.

In essence, the Zener diode 117 supplies the square wave voltage to the unijunction transistor 124 when the diode 112 opens to pass current to the Zener diode. The Zener diode thereby supplies the inner base current to the unijunction transistor 124. The unijunction transistor 124 is normally in the off condition and will be turned on, that is a condition where current will pass when the voltage of the emitter is equal to or exceeds the peak point voltage.

The capacitor 122 charges to a steady state value and the rate of approach to the steady state value is determined by the size of the resistors 113, 114, 116 and by the size of the capacitor 122. By changing the value on the set point potentiometer 17, it is possible to change the steady state value of the timing capacitor 122. Accordingly, if the resistance is increased in the potentiometer 17, the steady state voltage in the capacitor would increase so that firing of the unijunction transistor 124 would occur earlier. Accordingly, this would generate more coil current to open up the control valve V at an earlier period of time. Therefore, by increasing the resistance in the set point potentiometer 17, the silicon controlled rectifier 130 will fire earlier providing more lift to the valve plunger and more flow of gas through the valve V.

After the silicon controlled rectifier 130 has fired, current will flow into the solenoid coil 22, thereby generating a magnetic flux which produces a force on the valve plunger 49. This force will tend to move the valve plunger 49 upwardly in a manner which is hereinafter described in more detail. The control circuit produced by the circuit C is illustrated in FIGURE 5 where the control voltage is plotted as a function of time.

OPERATION OF THE TEMPERATURE CONTROL SYSTEM

The temperature control system and more specifically the furnace control system of the present invention is uniquely designed for conventional domestic hot-air gas furnaces, and can be scaled for large industrial use as well. As indicated above, the set point potentiometer 17, the thermistor 15 and compensating resistor 16 are all located in the controlled environment and connected to the control circuit C in the manner as illustrated in FIGURES 1 and 5. The desired temperature for the environment can be selected by the set point potentiometer 17 which also affects the firing angle of the silicon controlled rectifier 130. The actual existing temperature of the environment is sensed by the thermistor or temperature sensing resistor 15, which similarly controls the firing angle of the silicon controlled rectifier 130.

At the very start of the operation, for purposes of describing the system herein, it may be assumed that the furnace 1 is off and that the bonnet 3 is relatively cold. Consequently, when the switch 13 is closed the themistor 15 will sense a relatively cold temperature in the environment causing the silicon controlled rectifier 130 to fire in the manner as previously described. The firing of the silicon controlled rectifier 130 will transmit current to the solenoid coil 22 creating a magnetic flux condition. This will cause the valve plug 49 to snap to the open position or position of minimum modulation in the manner as previously described. In this position, the spring 34 will engage the annular groove around the plug 30. The gas from the furnace will pass from the control valve V through the orifice 8 where it will become admixed with the proper amount of air and admitted through the feeding tube 2 to the furnace 1. Assuming that the pilot light 12 is lit, the furnace 1 will become energized thereby heating the bonnet 3. It is to be noted that since the fluid in the bonnet 3 is at a relatively cold temperature, the switch 7 will remain in the open position, thereby deenergizing the blower 4. Furthermore, the switch 7 will not close until the heat conducting fluid in the bonnet has reached the desired temperature necessary to close the switch 7. At this point, the blower 4 will be energized admitting the fluid to the controlled environment.

The operation of the control valve V in the temperature control system can more fully be understood by analyzing the forces acting on the plunger 49 in the manner described in connection with the operation of the valve V. When the solenoid coil 22 is energized, a magnetic force created by the coil 22 will act upon the plunger 49 and tend to urge the same upwardly away from its seated position. Counterbalancing this force is the force of gravity which is a function of the weight of the valve plunger 49 and the differential pressure force times the area of the valve seat, which acts upon the plunger and tends to hold the same in the closed or seated position.

When the magnetic force increases, the valve plunger 49 will move upwardly. However, once the plunger 49 starts its upward movements, it should snap to the position of minimum modulation even though there was no increase of current, due to the fact that the valve plunger 49 would then be in an unstable range of operation. As the plunger shifts upwardly a greater portion of the mass of the plunger 49 will be subjected to the magnetic field and the magnetic force will increase until the plunger 49 reaches the position of minimum modulation.

FIGURE 7 provides a force-lift curve or so-called "lift-pull" series of curves showing the characteristics of the control valve. It can be seen that in the absence of current to the solenoid coil 22, the valve plunger 49 is held in the closed or seated position by the resultant of the two aforementioned forces. In the control valve V, the upper iron stop normally employed in solenoid valves has been omitted in order to eliminate the large increase in magnetic force which generally occurs with the valve lift. In the chart of FIGURE 7, a number of constant coil current forces have been illustrated and show the effect of magnetic force as a function of plunger lift.

When the valve plunger 49 is at a position between points $p_1$ and $p_2$, an unstable situation exists in which the plunger snaps up to a position between $p_2$ and $p_3$. A position between $p_2$ and $p_3$ would provide a stable condition of the valve. The closed position of the valve would generally correspond to a position between $p_1$ and $p_2$. The coil spring 34 is generally designed to make a contact with the plug 30 at point $p_4$ on any of the constant coil current curves. Under these conditions, a stable situation results at lifts above point $p_4$ so that increasing coil current causes greater compression of the spring 34 and results in increased plunger lift. The initial opening thus produced can be easily adjusted by adjusting the point at which spring compression begins by reference to FIGURE 6. Control of the maximum lift is easily obtained by limiting the maximum plunger lift with the non-magnetic stop rod 37. It should be observed that since the control valve V is provided with adjustment for maximum and minimum flow, the pressure regulator generally found in heating control systems can be eliminated.

The valve plunger 49 will remain in the unstable region during that portion of the force-lift curve where force increases with lift. When the force decreases with an increase in lift, then the valve plunger 49 has reached a stable position. The valve plunger 49 will contact the spring at some point in the unstable region of operation. At this position, there will be an additional force acting on the valve plunger, due to the force of the spring. Since the force acting on the valve plunger 49 increases with the plunger lift, the spring force will also increase. However, the differential pressure force times the area of the valve seat will no longer act upon the valve plunger 49. When the position of the valve plunger is described by the negative of the force-left curves, a small increase in lift produces a decrease in force or a negative upward force which then stabilizes the plunger motion by allowing it to contact the spring so that the plunger motion is negative. When the current to the solenoid coil 22 is eliminated, the magnetic force will also be eliminated permitting the valve plunger 49 to fall back to the seated position. During the shifting movement to the valve seat 50, the movement of the valve plunger can be described by the left side of the curves in FIGURE 7, where it is in an unstable region of operation. This type of operation can be translated directly into gas flow because the lift of the plunger determines the flow rate through the valve V and the area of the valve seat to the plunger must be in a 1:1 relationship so that a flow versus an error signal will give a linear relationship.

After the bonnet 3 has been heated sufficiently to cause the environment to reach the desired temperature set on the set point potentiometer 17 and this temperature is sensed by the thermistor 15, the control circuit C will no longer produce a control signal or at least, will produce a reduced signal. If this signal is not sufficient to sustain the valve V in the open position or at least at the position of minimum modulation, the valve plunger 49 will fall to the closed position. Again, if the temperature in the enviroment should drop slightly, the signal from the control circuit C may not be sufficient to snap the valve plunger 49 to its open position of minimum modulation. This would occur if the control signal was not strong enough to provide minimum flow conditions for the furnace 1. However when the environmental temperature is reduced to a point where the control signal was sufficient, the valve plunger 49 would snap to the open position where modulation would again occur.

It should be observed that a similar type of control action can be obtained with the valve V′. The operation of this valve was previously described and its operation in the temperature control system is substantially similar to that of the operation described in connection with the valve V. The valve V similarly does not modulate down to zero flow conditions. When the magnetic force signal is sufficiently strong due to a sufficiently strong control signal, the plunger tube 91 of the valve V′ will be pulled upwardly by the magnetic field. However, the plunger stem 92 may remain in the seated position during a portion of the time that the plunger tube 91 is being shifted upwardly. If the control signal to the solenoid coil 62 should suddenly become reduced, the magnetic field will be reduced and hence the plunger tube 91 will then fall back to its seated position as illustrated in FIGURE 3. This type of situation prevents any possible leakage of gas through the valve seat. However, if the control signal to the solenoid coil 62 is sufficiently strong to pull the plunger tube 91 upwardly when the plunger stem 92 will be moved from its seated position when carried by the plunger tube 91. Consequently, it can be seen that the entire valve plunger assembly 89 will snap open from its seated position. The spring 74 in the valve V is selected so that its spring constant is greater than the equivalent magnetic spring at the position of the valve plunger 89 when the spring 74 first contacts the plug 70. Consequently, it can be seen that the snap-open feature exists in the valve V′ and that also modulation can be controlled within a desired range in the valve V′. The operation of the control valve V′ can be more fully understood by analysis of the forces acting on the plunger assembly 89 in the manner described in connection with the operation of the valve V′.

EXAMPLE 1

A temperature control system substantially identical to the system illustrated in FIGURE 1 was constructed using the control valve V of FIGURE 2 and the control circuit C of FIGURE 5 in order to study the operating effects and efficiency of the overall system. The valve employed was a Hoke Series 90 solenoid valve which was modified in accordance with the present invention. The control valve had the following specifications.

| | |
|---|---|
| Plunger weight _____grams__ | 30.1 |
| Plunger outer diameter _____centimeter__ | 0.420 |
| Plunger diameter in fluid chamber _____do____ | 0.310 |
| Closure plug on lower end of plunger inch diameter__ | 0.265 |
| Effective plunger length _____inches__ | 2 |
| Sealing ring groove diameter _____do____ | 0.245 |
| Sealing ring groove width _____do____ | 0.065 |
| Outer shell, plunger tube assembly outer diameter _____do____ | ½ |
| Outer shell, plunger assembly inner diameter _____do____ | 0.430 |
| Distance between the flux plate and the upper surface of the valve plunger _____do____ | 0.032 |
| Spring outer diameter _____centimeter__ | 0.040 |
| Spring free length _____inches__ | 1.148 |
| Spring active coils _____ | 11 |
| Spring rate _____grams per inch__ | 500 |
| Spring wire _____inch diameter__ | 0.022 |
| Main valve seat _____do____ | 0.265 |

The solenoid coil of the control valve is characterized by the following data.

| | |
|---|---|
| Total coil turns _____ | 8000 |
| Total DC resistance _____ohms__ | 800 |
| Wire size _____gauge__ | 36 |
| Coil inner diameter _____inch__ | ½ |
| Coil outer diameter _____do____ | 1¼ |
| Coil height _____do____ | 1¼ |

The furnace control system was designed to employ 125,000 B.t.u.'s per hour with a heating value of natural gas of 1,000 B.t.u. per cubic foot. Air flow was used for testing purposes as the heat carrying gas. A five inch water pressure change was employed as the pressure change upstream of the valve. Two and five-tenths inches of water pressure was employed as a pressure change at maximum flow. Two and five-tenths inches of water pressure was the pressure for the burner orifice. A one-fourth inch orifice was employed in the downstream position. With this type of structure, the maximum rate of flow through the valve was 2.0 cubic feet per minute at a valve lift of 0.21 inch.

The valve was next connected to a control circuit which was constructed in conformance with FIGURE 4 with the following parts.

| Part | Reference numeral | Specification |
|---|---|---|
| Diode_____ | 112 | 1N1694. |
| Diode (Zener)_____ | 117 | 1N4748. |
| Unijunction transistor_____ | 124 | 2N1671. |
| Silicon controlled rectifier___ | 130 | C106B (General Electric). |
| Resistor_____ | 113 | 3.3K ohms, 1 watt. |
| Do_____ | 114 | Do. |
| Do_____ | 116 | 27 ohms, ½ watt, 10%. |
| Potentiometer_____ | 118 | 25K ohms <½ watt. |
| Do_____ | 17 | 10K ohms <½ watt. |
| Resistor_____ | 16 | 36K ohms, ½ watt 10%. |
| Do_____ | 127 | 270 ohms, ½ watt 10%. |
| Do_____ | 134′ | 100 ohms, 10 watts. |
| Do_____ | 128 | 47 ohms, ½ watt. |
| (Resistors + or − 20% unless specified) | | |
| Capacitor_____ | 115 | 0.1 mfd., 50 volts. |
| Do_____ | 122 | 0.068 mfd., 20 volts. |
| Do_____ | 134 | 20 mfd., 150 volts. |

The current in the coil was limited to less than 9 watts dissipation. A 100 ohm series resistance was used in the RC filter as a convenient adjustment. It was found that filtering capacitance was too low, erratic lifting occurred and pulsed solenoid flow occurred before the lift-off of the valve plunger. It was also found that if the capacitance was too high, hysteresis resulted through a lack of dither of the valve plunger. The gain of the unijunction transistor was increased by using a low thermistor value, roughly 15K ohms and compensating resistor. The control resistance was found to be 21K ohm + y(5K) where y is equal to the potentiometer fraction, $a_6$ is equivalent to the time that the silicon controlled rectifier was energized to the time of zero divided by the time for one cycle. The temperature change was calculated for a 31.5K ohm thermistor and a 36K ohm deviation from the set point (minimum flow).

The following data was thus determined.

TABLE 1

| y | Coil current (milliamperes) | a | Valve flow CFM | Temperature change, °F. |
|---|---|---|---|---|
| .420 | 48.9 | .180 | 0.61 | [1] 1.54 |
| .450 | 55.2 | .195 | 0.85 | 1.01 |
| .485 | 60.6 | .210 | 1.11 | 1.80 |
| .513 | 64.0 | .220 | 1.40 | 2.43 |
| .537 | 66.4 | .230 | 1.66 | 2.97 |
| .563 | 68.9 | .240 | 1.90 | 3.55 |
| .582 | 70.3 | .245 | 2.01 | 3.98 |
| .560 | 68.4 | --------- | 1.90 | 3.49 |
| .530 | 65.9 | --------- | 1.66 | 2.81 |
| .505 | 63.0 | --------- | 1.40 | 2.25 |
| .479 | 59.4 | --------- | 1.11 | 1.67 |
| .447 | 54.4 | --------- | .85 | .83 |
| .415 | 47.9 | --------- | .58 | .22 |
| .405 | 45.5 | --------- | .52 | [2] 0 |

[1] Snap open.
[2] Drop out point.

In table 1 "y" represents the potentiometer fraction which is a direct function of voltage to the control circuit and a represents the time from the silicon controlled rectifier energization to the time of zero crossing divided by the time of one cycle.

A plot of the air flow as a function of temperature change was made and is set forth in FIGURE 8 herein. The plots for both increasing and decreasing flow are set forth. It was found that the maximum flow before lift-off was 250 cubic centimeters per minute. The change of temperature from zero flow to the lift-off point was 0.5 degree Fahrenheit. A one percent change in line voltage produced a 0.16° F. change in the set point. A 1° F. change in coil temperature produced a 0.014° F. change in set point and 20° F. in controller temperature produced no change in the set point.

EXAMPLE 2

A temperature control system substantially identical to the system illustrated in FIGURE 1 was constructed using the modified control valve V' of FIGURE 3. The control circuit C of FIGURE 5 was also employed in order to study the operating effects and efficiency of the overall system and particularly with the control valve V'. The control valve V' differed only from the valve V in that a two-piece plunger assembly was employed. The plunger assembly had an outer diameter of 0.420 centimeter. The plunger tube had an overall length of 1⅜″ and the plunger guide had an overall length of 15/16″. When the guide and plunger tube were in the unseparated position, the plunger assembly had an overall length of 1⅞″. In the extended position, it had an overall length of approximately 2⅛″.

The same test was conducted as in Example 1 and it was found that the maximum flow before lift-off was reduced to 0.02 cubic centimeter per minute at 5″ of water pressure.

Having thus described my invention what I desire to claim and secure by Letters Patent is:

1. In a control valve having a central chamber with an inlet and outlet port opening into said chamber, a solenoid in said control valve, a valve seat formed on one of said ports and a nonmagnetic element opposite said valve seat; the improvement residing in a two-piece valve plunger, said plunger comprising a first section which is movable responsive to the receipt of a control signal by said solenoid coil, a second section shiftable in a slot formed in said first section and being adapted to be seated in a closurewise position on said valve seat, said first section being movable for a predetermined distance before said second section is movable from said valve seat, a position of minimum modulation established between said seat and said element, said plunger moving in a magnetically unstable region of operation between said seat and position of minimum modulation and in a magnetically stable region of operation when between the non-magnetic element and position of minimum modulation, and locking means operatively interconnecting said first and second section for preventing said second section from being completely removable from said first section.

2. The method of controlling the movable element of a dynamically operable fluid control device wherein the element is capable of moving between first and second end positions in said device; said method comprising creating a first force including the force of gravity upon said movable element tending to urge said movable element to the first end position, creating a second force including a differential pressure acting on said movable element tending to urge said movable element to said first end position, creating a magnetic force, causing said movable element to snap open to a position of minimum modulation established between said first and second end positions and in a magnetically unstable region of operation when said magnetic force exceeds the sum of said first and second forces, and causing said magnetic force to increase and said second force to decrease with movement of said element toward said second end position, and modulating the movable element between said position of minimum modulation and said second end position in a magnetically stable region of operation.

3. The method of claim 2 wherein the method comprises creating a mechanical force tending to move said element toward said first end position when said element has reached the position of minimum modulation.

4. A device for controlling the position of a movable member movable between first and second end positions with a position of minimum modulation established therebetween in response to a control signal, said device having an outer housing, said first and second end positions being established in said housing, a nonmagnetic element in said housing opposite said first end position, said movable member being located in said housing and being capable of being limited in its movement by said nonmagnetic element and said first end position, solenoid actuable means operatively associated with said housing and producing an electromagnetic force causing said movable member to snap open from its first end position to said position of minimum modulation in a magnetically unstable region of operation when said electromagnetic force exceeds a predetermined value, said movable member being normally biased to its first end position by a second force including the force of gravity through said magnetically unstable region of operation, and means to enable modulation of said movable member in a magnetically stable region of operation in response to an electromagnetic force after said movable member reaches the position of minimum modulation, said last named means including a member which prevents the movable member from initially contacting said nonmagnetic element when it reaches the position of minimum modulation.

5. A control valve for regulating flow of fluid in response to a control signal, said valve having an outer housing, a fluid port in said housing, a nonmagnetic element in said housing opposite said fluid port, a plunger movable in said housing and being capable of being limited in its movement by said nonmagnetic element and said fluid port, solenoid actuable means operatively associated with said housing and producing an electromagnetic force in response to receipt of control signals, said electromagnetic force causing said plunger to snap open from its closurewise position over said port to a position of minimum modulation established between said port and nonmagnetic element in a magnetically unstable region of operation when said electro-magnetic force exceeds a predetermined value, said plunger being normally biased to its closurewise position by a second force including the force of gravity through said magnetically unstable region of operation, and means to enable modulation of said plunger in a magnetically stable region of operation in response to an electromagnetic force after said plunger reaches the position of minimum modulation, said last named means including a member which prevents the plunger from initially contacting said nonmagnetic element when it reaches the position of minimum modulation.

6. The control valve of claim 5 further characterized in that said member comprises a spring interposed between the upper end of said plunger and the nonmagnetic member in said valve, said spring being smaller in an unstretched condition than said last named distance providing a gap between the upper end of the spring and the nonmagnetic stop.

7. The control valve of claim 5 further characterized in that the plunger is a unitary metallic member.

8. The control valve of claim 5 further characterized in that the plunger is a two-piece plunger, and one of the pieces is shiftable with respect to the other for an established distance and that the lower piece of said plunger will remain in closurewise position until the upper piece plunger has travelled the established distance.

9. The method of controlling the movable element of a dynamically operable device wherein the element is capable of moving between first and second end positions in said device; said method comprising creating a first force including the force of gravity acting upon said movable element tending to urge said movable element to the first end position, creating a second force including a differential pressure acting on said movable element tending to urge said movable element to said first end position, creating a magnetic force causing said movable element to snap open to a position of minimum modulation established between said first and second end positions and in a magnetically unstable region of operation when said magnetic force exceeds the sum of said first and second forces and causing said magnetic force to increase and said second force to decrease with movement of said element toward said second end position, and modulating the movable element between said position of minimum modulation and said second end position in a magnetically stable region of operation.

References Cited
UNITED STATES PATENTS

| | | | |
|---|---|---|---|
| 1,167,815 | 1/1916 | Gold | 251—129 |
| 2,121,657 | 6/1938 | Fisher | 251—129 XR |
| 2,297,626 | 9/1942 | Lennholm et al. | 251—129 XR |

FOREIGN PATENTS 806,223  9/1936  France.

HENRY T. KLINKSIEK, Primary Examiner

U.S. Cl. X.R.

251—129